US012138913B2

(12) United States Patent
Song et al.

(10) Patent No.: US 12,138,913 B2
(45) Date of Patent: Nov. 12, 2024

(54) CONTROL UNIT AND SUBSTRATE TREATING APPARATUS INCLUDING THE SAME

(71) Applicant: SEMES CO., LTD., Chungcheongnam-do (KR)

(72) Inventors: Yeon Chul Song, Seoul (KR); Myeong Jun Lim, Gyeonggi-do (KR); Kwang Sup Kim, Chungcheongnam-do (KR); Jong Min Lee, Gyeonggi-do (KR); Jun Ho Oh, Gyeonggi-do (KR); Ji Hoon Yoo, Gyeonggi-do (KR); Young Ho Park, Incheon (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/876,545

(22) Filed: Jul. 29, 2022

(65) Prior Publication Data

US 2023/0101546 A1 Mar. 30, 2023

(30) Foreign Application Priority Data

Sep. 30, 2021 (KR) ........................ 10-2021-0130203

(51) Int. Cl.

*B41J 2/045* (2006.01)
*B41J 29/20* (2006.01)
*B41J 2/165* (2006.01)

(52) U.S. Cl.

CPC ....... *B41J 2/04513* (2013.01); *B41J 2/04581* (2013.01); *B41J 29/20* (2013.01); *B41J 2/165* (2013.01); *B41J 2/16579* (2013.01)

(58) Field of Classification Search

CPC .... B41J 2/16517; B41J 2/195; B41J 2/04513; B41J 2/04581; B41J 29/20; B41J 2/165; B41J 2/16579

See application file for complete search history.

(56) References Cited

U.S. PATENT DOCUMENTS 11,485,132 B2 * 11/2022 Kim ........................ B41J 2/0451
2009/0015623 A1 * 1/2009 Miyamoto ............. B41J 29/393 347/19

FOREIGN PATENT DOCUMENTS

KR 10-0522936 10/2005
KR 10-2006-0133451 12/2006
KR 10-2020-0141645 12/2020

* cited by examiner

*Primary Examiner* — Kristal Feggins
(74) *Attorney, Agent, or Firm* — Womble Bond Dickinson (US) LLP

(57) ABSTRACT

Provided are a control unit that predicts the life of an inkjet head unit and maximizes its life to be used, and a substrate treating apparatus including the same. The control unit performs maintenance of an inkjet head unit for discharging a substrate treatment liquid onto a substrate and comprises a count module for counting the number of discharges for each nozzle of the inkjet head unit, a comparison module for comparing the number of discharges with a reference value to determine whether the number of discharges is equal to or greater than the reference value, and an evaluation module for evaluating whether a life of the inkjet head unit has reached a usable life based on whether the number of discharges of each nozzle is equal to or greater than the reference value.

18 Claims, 6 Drawing Sheets

CONTROL UNIT AND SUBSTRATE TREATING APPARATUS INCLUDING THE SAME

This application claims the benefit of Korean Patent Application No. 10-2021-0130203, filed on Sep. 30, 2021, in the Korean Intellectual Property Office, the disclosure of which is incorporated herein by reference in its entirety.

BACKGROUND

1. Field present disclosure relates to a control unit and a substrate treating apparatus including the same. More particularly, it relates to a control unit applicable to a facility used for manufacturing a display device, and a substrate treating apparatus including the same.

2. Description of the Related Art

When performing a printing process (e.g., RGB Patterning) on a transparent substrate to manufacture a display device such as an LCD panel, PDP panel, LED panel, etc., a printing equipment having an inkjet head unit may be used.

SUMMARY

The inkjet head unit may include a plurality of nozzles to discharge ink onto the substrate. However, if even one nozzle among the plurality of nozzles is defective, the print quality of the substrate may be deteriorated, which may result in material/time waste.

The replacement timing of the conventional inkjet head unit depends on a manual provided by the manufacturer. However, since the performance degradation point of the inkjet head unit may vary depending on the use environment, degradation of the inkjet head unit performance cannot be predicted by the above method, and accordingly, it is difficult to prevent deterioration in print quality in advance.

A technical object of the present disclosure is to provide a control unit capable of predicting the life of an inkjet head unit and maximizing its life to be used, and a substrate treating apparatus including the same.

The objects of the present disclosure are not limited to the objects mentioned above, and other objects not mentioned will be clearly understood by those skilled in the art from the following description.

One aspect of the control unit according to the present disclosure for achieving the above technical object performs maintenance of an inkjet head unit for discharging a substrate treatment liquid onto a substrate and comprises a count module for counting the number of discharges for each nozzle of the inkjet head unit, a comparison module for comparing the number of discharges with a reference value to determine whether the number of discharges is equal to or greater than the reference value, and an evaluation module for evaluating whether a life of the inkjet head unit has reached a usable life based on whether the number of discharges of each nozzle is equal to or greater than the reference value.

Wherein the count module counts the number of discharges based on whether a voltage is applied to a piezoelectric element involved in operation of a nozzle.

Wherein the piezoelectric element is provided in the same number as the nozzle, and the count module counts the number of discharges based on whether a voltage is applied to a piezoelectric element in a corresponding relationship to the nozzle.

Wherein the reference value is related to at least one of a print quality for the substrate and a nozzle that does not participate in printing the substrate.

Wherein the reference value is related to the print quality, the reference value is a usage amount of a nozzle related to a case where a stain is formed on the substrate, or a usage amount of a nozzle related to a case where flatness of a layer formed on the substrate by print does not meet criteria.

Wherein when the reference value is related to a nozzle that does not participate in printing the substrate, the reference value is a usage amount of a defective nozzle determined as defective.

Wherein the defective nozzle is related to at least one of satellite discharge, non-discharge, and discharge position inaccuracy.

The control unit of claim comprises any one of a memory module for storing the reference value, an input module for inputting the reference value, and a communication module for receiving the reference value from an outside, wherein the reference value is provided to the comparison module through any one of the memory module, the input module, and the communication module.

Wherein the evaluation module compares the number of nozzles having the number of discharges equal to or greater than the reference value with a reference number to evaluate whether a life of the inkjet head unit reaches a usable life.

If the number of nozzles is equal to or greater than the reference number, the evaluation module evaluates that a life of the inkjet head unit has reached a usable life, and requests replacement of the inkjet head unit that has reached a usable life.

Wherein the control unit allows a nozzle with a relatively small usage amount based on a usage amount for each nozzle to participate in printing the substrate.

The control unit further comprises an extraction module for extracting a nozzle with a relatively small usage amount based on a usage amount for each nozzle, and a control module for controlling the extracted nozzle to participate in printing the substrate, wherein the extraction module and the control module operate when it is evaluated that a life of the inkjet head unit has not reached a usable life.

Wherein the extraction module extracts a nozzle with a usage amount less than or equal to a reference amount, or extracts a nozzle with the smallest usage amount.

Wherein the control unit determines whether the number of discharges matches the number of times voltage is applied to a piezoelectric element involved in operation of the nozzle.

Wherein the control unit determines whether a match is made based on whether a nozzle normally discharges the substrate treatment liquid onto the substrate when a voltage is applied to the piezoelectric element.

The control unit further comprises an imaging module for capturing a space between a nozzle and the substrate using a camera sensor, and a treating module for determining whether a nozzle discharges the substrate treatment liquid onto the substrate based on image information obtained through capturing.

Wherein the imaging module captures the space when a voltage is applied to the piezoelectric element.

Another aspect of the control unit according to the present disclosure for achieving the above technical object performs maintenance of an inkjet head unit for discharging a substrate treatment liquid onto a substrate and comprises a count module for counting the number of discharges for each nozzle of the inkjet head unit, wherein the count module counts the number of discharges based on whether a voltage is applied to a piezoelectric element involved in operation of a nozzle, a comparison module for comparing the number of discharges with a reference value to determine whether the number of discharges is equal to or greater than the reference value, and an evaluation module for evaluating whether a life of the inkjet head unit has reached a usable life based on whether the number of discharges of each nozzle is equal to or greater than the reference value, wherein the control unit allows a nozzle with a relatively small usage amount in printing the substrate based on a usage amount for each nozzle, wherein the reference value is related to at least one of a print quality for the substrate and a nozzle that does not participate in printing the substrate.

One aspect of the apparatus treating apparatus according to the present disclosure for achieving the above technical object comprises a process treating unit for supporting a substrate while the substrate is treated, an inkjet head unit including a plurality of nozzles and for discharging a substrate treatment liquid onto the substrate through the plurality of nozzles, a gantry unit for moving the inkjet head unit, a substrate treatment liquid supply unit for supplying the substrate treatment liquid to the inkjet head unit, and a control unit for performing maintenance of the inkjet head unit, wherein the control unit comprises a count module for counting the number of discharges for each nozzle of the inkjet head unit, a comparison module for comparing the number of discharges with a reference value to determine whether the number of discharges is equal to or greater than the reference value, and an evaluation module for evaluating whether a life of the inkjet head unit has reached a usable life based on whether the number of discharges of each nozzle is equal to or greater than the reference value.

The substrate treating apparatus further comprises a camera sensor for capturing a space between the at least one nozzle and the substrate when at least one of the plurality of nozzles discharges the substrate treatment liquid onto the substrate.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
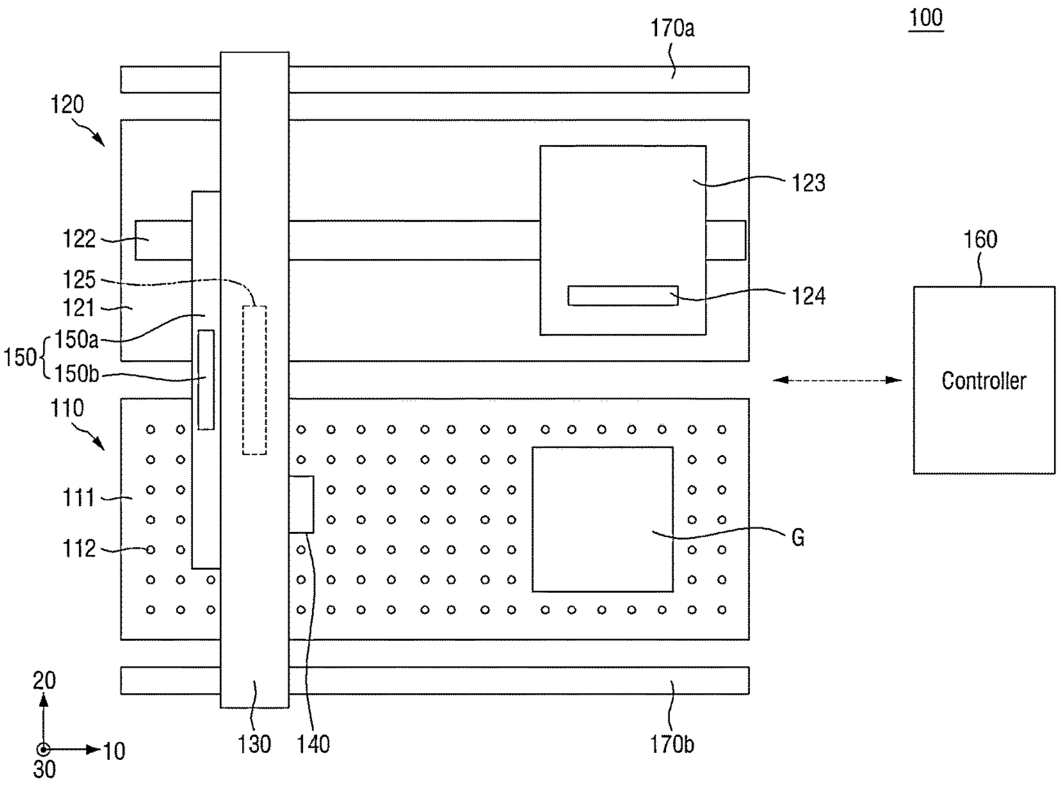
FIG. 1 is a diagram exemplarily showing the structure of a substrate treating apparatus according to an embodiment of the present disclosure.

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the present disclosure is not limited to the embodiments described below, but may be implemented in various different forms, and these embodiments are provided only for making the description of the present disclosure complete and fully informing those skilled in the art to which the present disclosure pertains on the scope of the present disclosure, and the present disclosure is only defined by the scope of the claims. Like reference numerals refer to like elements throughout.

When an element or layer is referred as being located "on" another element or layer, it includes not only being located directly on the other element or layer, but also with intervening other layers or elements. On the other hand, when an element is referred as being "directly on" or "immediately on," it indicates that no intervening element or layer is interposed.

Spatially relative terms "below," "beneath," "lower," "above," and "upper" can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical concept of the present disclosure.

The terminology used herein is for the purpose of describing the embodiments and is not intended to limit the present disclosure. In the present disclosure, the singular also includes the plural, unless specifically stated otherwise in the phrase. As used herein, "comprises" and/or "comprising" refers to that components, steps, operations and/or elements mentioned does not exclude the presence or addition of one or more other components, steps, operations and/or elements.

Unless otherwise defined, all terms (including technical and scientific terms) used herein may be used with the meaning commonly understood by those of ordinary skill in the art to which the present disclosure belongs. In addition, terms defined in a commonly used dictionary are not to be interpreted ideally or excessively unless clearly defined in particular.

Hereinafter, embodiments of the present disclosure will be described in detail with reference to the accompanying drawings, and in the description with reference to the accompanying drawings, the same or corresponding components are given the same reference numbers, regardless of reference numerals in drawings, and an overlapped description therewith will be omitted.

The present disclosure relates to a control unit that predicts the life of an inkjet head unit and maximizes its life to be used, and a substrate treating apparatus including the same. Hereinafter, the present disclosure will be described in detail with reference to drawings and the like.

FIG. 1 is a diagram exemplarily showing the structure of a substrate treating apparatus according to an embodiment of the present disclosure.

The substrate treating apparatus 100 treats a substrate G (e.g., a glass substrate) used for manufacturing a display device. The substrate treating apparatus 100 may be implemented as an inkjet facility for jetting a substrate treatment liquid onto the substrate G using the inkjet head unit 140, and in particular, it may be implemented with a circulation system inkjet facility to prevent a nozzle from clogging by the substrate treatment liquid. The substrate treating apparatus 100 may be provided as, for example, a quantum dot (QD) color filter (CF) inkjet system.

Referring to FIG. 1, a substrate treating apparatus 100 may comprise a process treating unit 110, a maintenance unit 120, a gantry unit 130, an inkjet head unit 140, a substrate treatment liquid supply unit 150 and a control unit (or controller) 160.

The process treating unit 110 supports the substrate G while the PT operation is performed on the substrate G. The process treating unit 110 may support the substrate G using a non-contact method. The process treating unit 110 may support the substrate G by levitating the substrate G in the air using, for example, air. However, the present embodiment is not limited thereto. The process treating unit 110 may support the substrate G using a contact method. The process treating unit 110 may support the substrate G using, for example, a support member having a seating surface provided thereon.

On the other hand, the PT operation refers to the printing treatment of the substrate G using the substrate treatment liquid, and the substrate treatment liquid refers to a chemical solution used to print the substrate G. The substrate treatment liquid may be, for example, QD ink including ultrafine semiconductor particles.

When the substrate G is supported by using air, the process treating unit 110 may include a first stage 111 and an air hole 112.

The first stage 111 serves as a base, and is provided so that the substrate G can be seated thereon. The air holes 112 may be formed passing through the upper surface of the first stage 111, and a plurality of air holes 112 may be formed in the PT zone on the first stage 111.

The air hole 112 may inject air in the upper direction (the third direction 30) of the first stage 111. The air hole 112 may levitate the substrate G seated on the first stage 111 through the air hole 112.

Meanwhile, although not shown in FIG. 1, the process treating unit 110 may further include a gripper. The gripper is for preventing the substrate G from being separated from the first stage 111 when the substrate G moves along the longitudinal direction (the first direction 10) of the first stage 111. The gripper can hold the substrate G to prevent it from being separated from the first stage 111, and when the substrate G moves, the gripper may slide along a guide rail (not shown) while holding the substrate G.

The maintenance unit 120 measures a discharge position (i.e., a spot) of the substrate treatment liquid on the substrate G, whether the substrate treatment liquid is discharged, and the like. The maintenance unit 120 may measure the discharge position of the substrate treatment liquid, whether the substrate treatment liquid is discharged, etc. with respect to each of the plurality of nozzles provided in the inkjet head unit 140, and provide the obtained measurement result to the control unit 160.

The maintenance unit 120 may comprise, for example, a second stage 121, a third guide rail 122, a first plate123, a calibration board 124 and a vision module 125.

Like the first stage 111, the second stage 121 serves as a base and may be disposed in parallel with the first stage 111. The second stage 121 may be provided to have the same size as the first stage 111, but may be provided to have a size smaller or larger than that of the first stage 111. The second stage 121 may include an MT zone thereon.

The third guide rail 122 guides the movement path of the first plate 123. The third guide rail 122 may be provided on the second stage 121 along the longitudinal direction (the first direction 10) of the second stage 121 as at least one line. The third guide rail 122 may be implemented as, for example, an LM guide system (Linear Motor Guide System).

Meanwhile, although not shown in FIG. 1, the maintenance unit 120 may further comprise a fourth guide rail. Like the third guide rail 122, the fourth guide rail guides the movement path of the first plate 123, and may be provided on the second stage 121 along the width direction (second direction 20) of the second stage 121 as at least one line. The fourth guide rail may also be implemented as an LM guide system like the third guide rail 122.

The first plate 123 moves on the second stage 121 along the third guide rail 122 and/or the fourth guide rail. The first plate 123 may move in parallel with the substrate G along the third guide rail 122, and may approach or move away from the substrate G along the fourth guide rail.

The calibration board 124 is for measuring the discharge position of the substrate treatment liquid on the substrate G. The calibration board 124 may be installed on the first plate 123 including an align mark, a ruler, and the like, and may be provided along the longitudinal direction (first direction 10) of the first plate 123.

The vision module 125 acquires image information on the substrate Gin order to measure the discharge position of the substrate treatment liquid, whether the substrate treatment liquid is discharged, and the like. The vision module 125 may include an area scan camera, a line scan camera, and the like, and may acquire image information on the substrate G in real time. Meanwhile, the vision module 125 may obtain and provide information on the calibration board 124 as well as information on the substrate G on which the substrate treatment liquid is discharged.

The vision module 125 may be provided on the side or below the gantry unit 130 to capture the substrate G or the like. The vision module 125 may be installed, for example, to be attached to a side surface of the inkjet head unit 140. However, the present embodiment is not limited thereto. The vision module 125 may be provided on the first plate 123. Meanwhile, a plurality of vision modules 125 may be provided in the substrate treating apparatus 100, and may be fixedly installed or movably installed.

The gantry unit 130 supports the inkjet head unit 140. The gantry unit 130 may be provided above the first stage 111 and the second stage 121 so that the inkjet head unit 140 can discharge the substrate treatment liquid onto the substrate G.

The gantry unit 130 may be provided on the first stage 111 and the second stage 121 with the width direction (the second direction 20) of the first stage 111 and the second stage 121 as the longitudinal direction. The gantry unit 130 may move in a longitudinal direction (first direction 10) of the first stage 111 and the second stage 121 along the first guide rail 170*a* and the second guide rail 170*b*. Meanwhile, the first guide rail 170*a* and the second guide rail 170*b* may be provided outside the first stage 11 and the second stage 121 along the longitudinal direction (the first direction 10) of the first stage 111 and the second stage 121.

Meanwhile, although not shown in FIG. 1, the substrate treating apparatus 100 may further include a gantry moving unit. The gantry moving unit moves the gantry unit 130 along the first guide rail 170*a* and the second guide rail 170*b*. The gantry moving unit may be installed inside the gantry unit 130 and may include a first moving module (not shown) and a second moving module (not shown). The first moving module and the second moving module may be provided at both ends within the gantry unit 130, and may slidably move the gantry unit 130 along the first guide rail 170*a* and the second guide rail 170*b*.

The inkjet head unit 140 discharges the substrate treatment liquid on the substrate G in the form of droplets. The inkjet head unit 140 may be provided on the side or below the gantry unit 130.

At least one inkjet head unit 140 may be installed in the gantry unit 130. When a plurality of inkjet head units 140 are installed in the gantry unit 130, the plurality of inkjet head units 140 may be arranged in a line along the longitudinal direction (the second direction 20) of the gantry unit 130.

The inkjet head unit 140 may move along the longitudinal direction (the second direction 20) of the gantry unit 130 to be located at a desired point on the substrate G. However, the present embodiment is not limited thereto. The inkjet head unit 140 may move along the height direction (the third direction 30) of the gantry unit 130, and also may rotate clockwise or counterclockwise.

Meanwhile, the inkjet head unit 140 may be installed to be fixed to the gantry unit 130. In this case, the gantry unit 130 may be provided to be movable.

Meanwhile, although not shown in FIG. 1, the substrate treating apparatus 100 may further include an inkjet head moving unit. The inkjet head moving unit linearly moves or rotates the inkjet head unit 140. When the substrate treating apparatus 100 is configured to include a plurality of inkjet head units 140, the inkjet head moving unit may be provided in the substrate processing apparatus 100 corresponding to the number of the inkjet head units 140 to independently operate the plurality of inkjet head units 140. Meanwhile, a single inkjet head moving unit may be provided in the substrate processing apparatus 100 to uniformly operate the plurality of inkjet head units 140.

Meanwhile, although not shown in FIG. 1, the inkjet head unit 140 may include a nozzle plate, a plurality of nozzles, a piezoelectric element, and the like. The nozzle plate constitutes the body of the inkjet head unit 140. A plurality of (e.g., 128, 256, etc.) nozzles may be provided in multiple rows and columns at regular intervals below the nozzle plate, and the piezoelectric element may be provided as many as the number corresponding to the number of nozzles in the nozzle plate. When the inkjet head unit 140 is configured as described above, the substrate treatment liquid may be discharged onto the substrate G through the nozzle according to the operation of the piezoelectric element.

Meanwhile, the inkjet head unit 140 may independently control the discharge amount of the substrate treatment liquid provided through each nozzle according to a voltage applied to the piezoelectric element.

The substrate treatment liquid supply unit 150 supplies ink to the inkjet head unit 140. The substrate treatment liquid supply unit 150 may include a storage tank 150*a* and a pressure control module 150*b*.

The storage tank 150*a* stores the substrate treatment liquid, and the pressure control module 150*b* controls the internal pressure of the storage tank 150*a*. The storage tank 150*a* may supply an appropriate amount of the substrate treatment liquid to the inkjet head unit 140 based on the pressure provided by the pressure control module 150*b*.

The control unit 160 is to perform maintenance on the inkjet head unit 140. The control unit 160 corrects a substrate treatment liquid discharge position of each nozzle provided in the inkjet head unit 140, or detects a defective nozzle (i.e., a nozzle that does not discharge the substrate treatment liquid) among a plurality of nozzles to perform a cleaning operation on the defective nozzle based on the measurement result of the maintenance unit 120. To this end, the control unit 160 may control the operation of each component constituting the substrate treating apparatus 100.

The control unit 160 may be implemented as a computer or a server, including a process controller, a control program, an input module, an output module (or a display module), a memory module, and the like. In the above, the process controller may include a microprocessor for executing a control function for each component constituting the substrate treating apparatus 100, and the control program may execute various treatment of the substrate treating apparatus 100 according to the control of the process controller. The memory module stores programs for executing various treatment of the substrate treating apparatus 100 according to various data and treating conditions, that is, treating recipes.

In order to prevent deterioration of the print quality of the substrate G due to a defective nozzle, it is necessary to predict the life of the inkjet head unit 140. When the case where there are simply many defects in the print result is the replacement timing of the inkjet head unit 140, or the case where the nozzle out continuously increases during the NJI (Nozzle Jetting Inspection) process is the replacement timing of the inkjet head unit 140, it may be difficult to prevent in advance that a defective nozzle is used in printing the substrate G.

In this embodiment, in order to solve this problem, the life of the inkjet head unit 140 can be predicted using the control unit 160, and the inkjet head unit 140 can be used to maximize its life based on the prediction result. Hereinafter, such a role of the control unit 160 will be described in detail.

Figure 2:
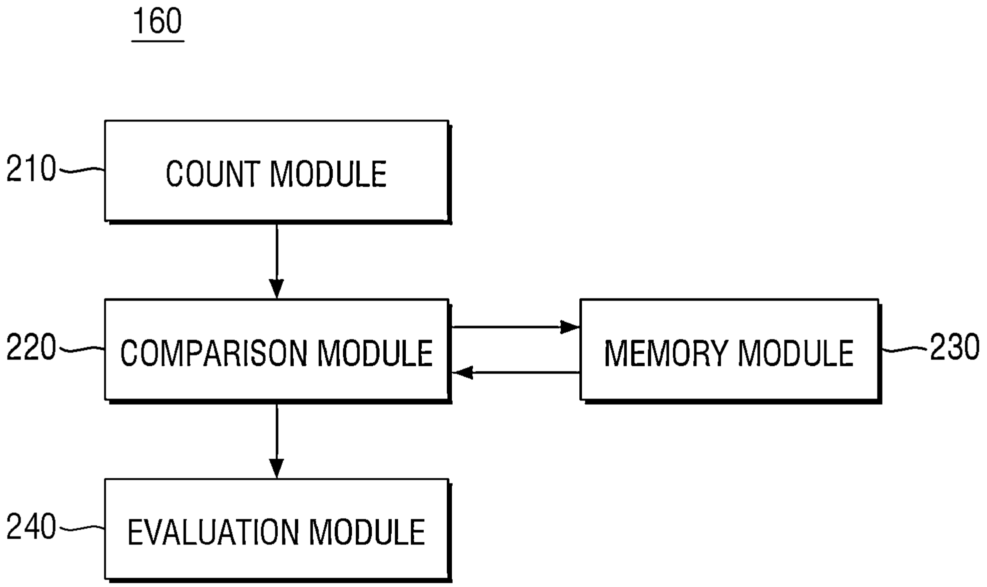
FIG. 2 is a first exemplary diagram schematically illustrating an internal module of a control unit constituting a substrate treating apparatus according to an embodiment of the present disclosure.

FIG. 2 is a first exemplary diagram schematically illustrating an internal module of a control unit constituting a substrate treating apparatus according to an embodiment of the present disclosure.

According to FIG. 2, the control unit 160 may include a count module 210, a comparison module 220, a memory module 230, and an evaluation module 240.

The count module 210 functions to count the number of discharges for each nozzle constituting the inkjet head unit 140.

As described above, the inkjet head unit 140 may include a nozzle plate, a plurality of nozzles, a piezoelectric element (or a piezo element), and the like. Here, the piezoelectric elements are provided to correspond to the number of nozzles, and each nozzle may discharge the substrate treatment liquid onto the substrate G according to the operation of the piezoelectric elements in the corresponding relationship. That is, the number of discharges of each nozzle may be counted based on whether a voltage is applied to a piezoelectric element in the corresponding relationship.

In this way, the count module 210 may count the number of discharges for each nozzle based on the number of times voltage is applied to the piezoelectric element in a corresponding relationship.

Meanwhile, even though a voltage is applied to the piezoelectric element, the nozzle may not discharge the substrate treatment liquid due to a program error or the like. In this case, the number of times the voltage is applied to the piezoelectric element and the number of discharges of the nozzle do not match each other, so that the number of discharges of the nozzle may be counted inaccurately.

Figure 3:
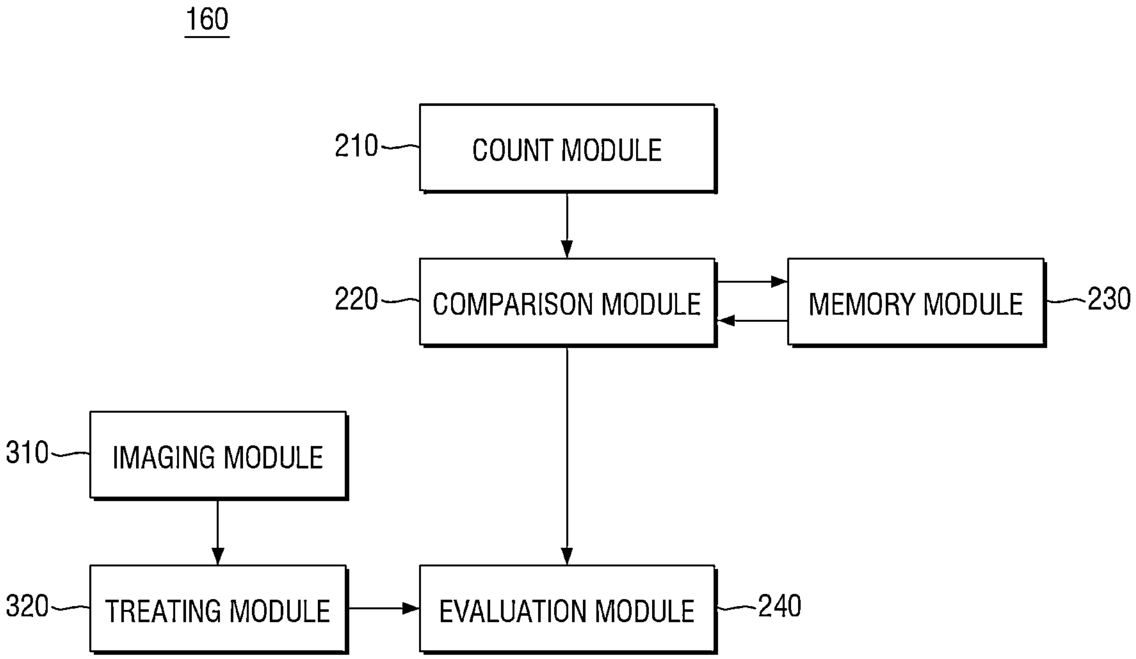
FIG. 3 is a second exemplary diagram schematically illustrating an internal module of a control unit constituting a substrate treating apparatus according to an embodiment of the present disclosure.

The substrate treating apparatus 100 may further include a camera sensor in consideration of the above case, and the control unit 160 may further include an imaging module 310 and a treating module 320 as shown in FIG. 3.

FIG. 3 is a second exemplary diagram schematically illustrating an internal module of a control unit constituting a substrate treating apparatus according to an embodiment of the present disclosure.

Figure 4:
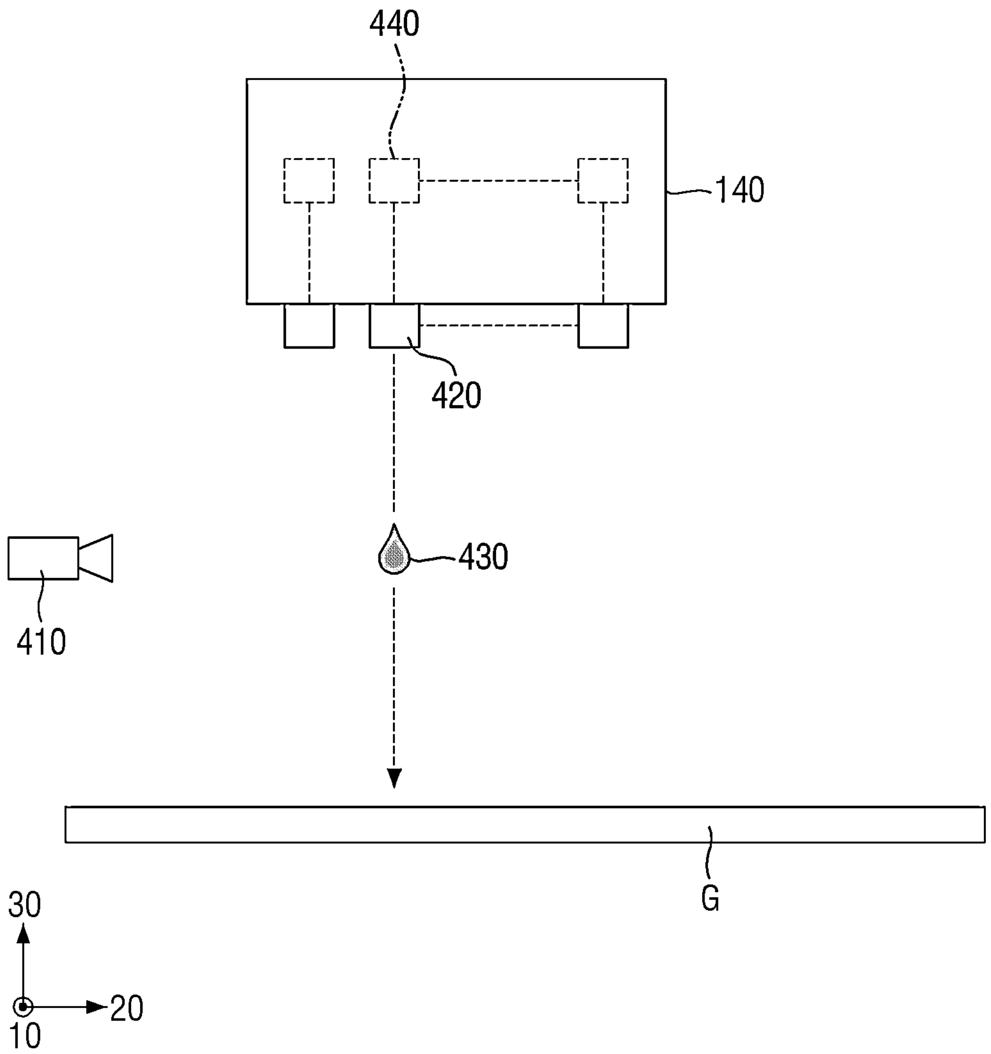
FIG. 4 is an exemplary diagram for describing a function of a control unit constituting a substrate treating apparatus according to an embodiment of the present disclosure.

The camera sensor 410 may captures the substrate treatment liquid 430 discharged onto the substrate G by the nozzle 420 as shown in FIG. 4. For this purpose, the camera sensor 410 may be disposed to caputre the space between the nozzle 420 of the inkjet head unit 140 and the substrate G.

FIG. 4 is an exemplary diagram for describing a function of a control unit constituting a substrate treating apparatus according to an embodiment of the present disclosure.

The imaging module 310 may control the camera sensor 410. The imaging module 310 may control the camera sensor 410 so that the camera sensor 410 captures the substrate treatment liquid 430 discharged onto the substrate G by the nozzle 420.

The imaging module 310 may control the camera sensor 410 when the nozzle 420 discharges the substrate treatment liquid 430 onto the substrate G. Specifically, the imaging module 310 predicts that when a voltage is applied to the piezoelectric element 440 in corresponding relationship to the nozzle 420, the nozzle 420 discharges the substrate treatment liquid 430 onto the substrate G. Based on the prediction, it may control the camera sensor 410.

In this embodiment, when the camera sensor 410 captures the space between the nozzle 420 and the substrate G under the control of the imaging module 310 to obtain image information, it can be determined whether the number of discharges of the nozzle 420 is accurately counted using the image information.

The treating module 320 can determine whether the nozzle 420 normally discharges the substrate treatment liquid 430 onto the substrate G based on the image information acquired by the camera sensor 410 under the control of the imaging module 310.

When a voltage is applied to the piezoelectric element 440, the nozzle 420 in a corresponding relationship to the piezoelectric element 440 discharges the substrate treatment liquid 430 onto the substrate G according to the operation of the piezoelectric element 440, and the camera sensor 410 may capture the substrate treatment liquid 430 falling onto the substrate G. Therefore, the substrate treatment liquid 430 should appear in the image information acquired by the camera sensor 410. The treating module 320 may determine whether the nozzle 420 normally discharges the substrate treatment liquid 430 onto the substrate Gin consideration of this point.

After determining whether the nozzle 420 normally discharges the substrate treatment liquid 430 onto the substrate G, the treating module 320 may determine whether the number of discharges of the nozzle 420 is accurately counted.

When the nozzle 420 normally discharges the substrate treatment liquid 430 onto the substrate G, the number of times a voltage is applied to the piezoelectric element 440 and the number of discharges of the nozzle 420 match with each other. Accordingly, in this case, the treating module 320 may determine that the number of discharges of the nozzle 420 is accurately counted.

On the other hand, when the nozzle 420 does not normally discharge the substrate treatment liquid 430 onto the substrate G, the number of times voltage is applied to the piezoelectric element 440 and the number of discharges of the nozzle 420 do not match. Accordingly, in this case, the treating module 320 may determine that the number of discharges of the nozzle 420 is not accurately counted.

Meanwhile, in the present embodiment, in order to increase the image acquisition rate of the substrate treatment liquid 430 falling onto the substrate G, the camera sensor 410 may continuously capture images at regular time intervals. In this case, the camera sensor 410 may continuously capture images from the point in time when the nozzle 420 discharges the substrate treatment liquid 430 to the point in time when the substrate treatment liquid 430 arrives on the substrate G.

Meanwhile, the treating result of the treating module 320 may be provided to the evaluation module 240, and the evaluation module 240 may utilize the treating result of the treating module 320 when evaluating the life of the inkjet head unit 140.

It will be described again with reference to FIG. 2.

The comparison module 220 functions to compare the number of discharges of the nozzle 420 with a reference value. The comparison module 220 may determine whether the number of discharges of the nozzle 420 is equal to or greater than a reference value through the comparison. The comparison module 220 may perform the comparison after receiving the number of discharges of the nozzle 420 from the count module 210.

The memory module 230 functions to store a reference value. When comparing the number of discharges of the nozzle 420 with the reference value, the comparison module 220 may read the reference value from the memory module 230 and then perform the comparison. Receiving the number of discharges of the nozzle 420 from the count module 210 and reading the reference value from the memory module 230 may be performed simultaneously, but either one may be performed first.

The reference value may be determined in advance based on a user experiential replacement cycle and stored in the memory module 230. Here, the user experiential replacement cycle refers to a case, in which the quality of the final printing result for the substrate G is poor, a case, in which there are many nozzle outs, and the like.

After the substrate G is printed using the plurality of nozzles of the inkjet head unit 140, the printing result of the substrate G may be inspected. At this time, if the printing result of the substrate G meets the criteria, the printing result of the substrate G is determined as good, and if the printing result of the substrate G does not meet the criteria, the printing result of the substrate G may be determined as defective.

As the frequency of use of the nozzle increases, the nozzle may fail to discharge a specified amount of the substrate treatment liquid onto the substrate G, or may discharge the substrate treatment liquid outside a designated position on the substrate G due to particles accumulating therein. In this case, the printing result of the substrate G does not meet the criteria, and thus the printing result of the substrate G may be determined as defective. In this embodiment, it is possible to identify how many times the nozzle is used when the printing result of the substrate G becomes poor, and determine the value as a reference value.

On the other hand, in this embodiment, it is also possible to identify how many times the nozzle is used when the flatness of the layer formed on the substrate G does not meet the criteria through printing, or when problems such as stains occur on the substrate G, and determine the value as a reference value.

Meanwhile, as described above, as the frequency of use of the nozzle increases, particles are accumulated therein, and problems such as satellite discharge, non-discharge, and poor discharge position accuracy may occur. In this embodiment, such a nozzle is defined as a defective nozzle, and when the substrate G is printed, the nozzle may not be allowed to participate in printing. In the present embodiment, a case in which the nozzle does not participate in printing the substrate G is defined as nozzle out.

In the inspection process, it is possible to identify how many times the nozzle is used when the nozzle is nozzle out. In this embodiment, the value may be determined as a reference value.

Although not shown in FIG. 1, the substrate treating apparatus 100 may include a separate inspection apparatus. The determination of the reference value may be performed by a separately provided inspection device as described above.

Figure 5:
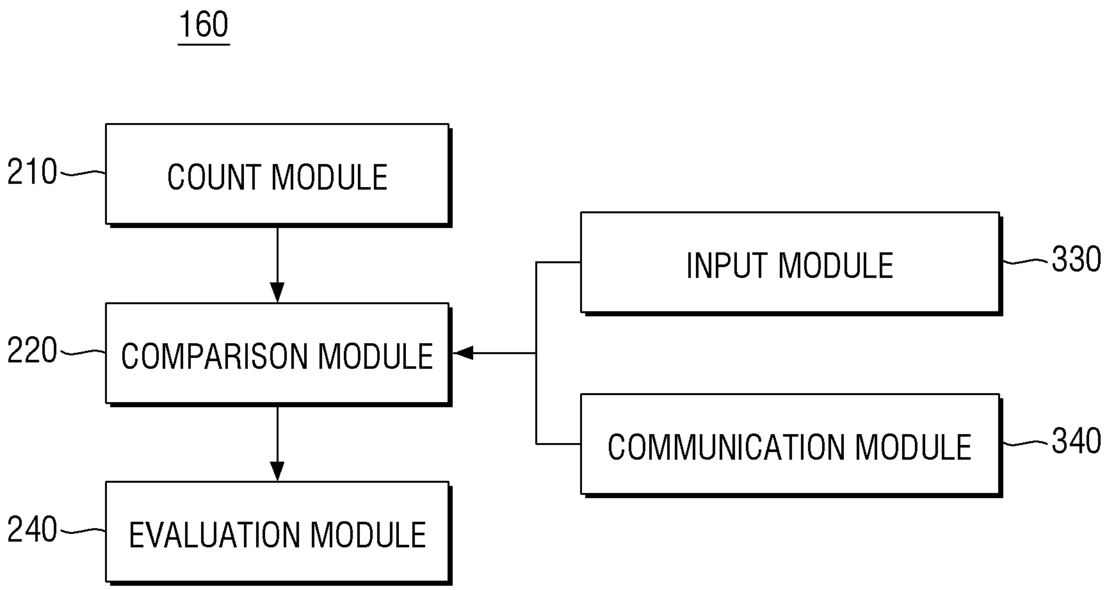
FIG. 5 is a third exemplary diagram schematically illustrating an internal module of a control unit constituting a substrate treating apparatus according to an embodiment of the present disclosure.

As described above, after reading the reference value from the memory module 230, the comparison module 220 may compare the number of discharges of the nozzle with the reference value. However, the present embodiment is not limited thereto. After receiving the reference value through the input module 330, the comparison module 220 may compare the number of discharges of the nozzle with the reference value, or after receiving the reference value through the communication module 340, the comparison module 220 may compare the number of discharges of the nozzle with the reference value. FIG. 5 is a third exemplary diagram schematically illustrating an internal module of a control unit constituting a substrate treating apparatus according to an embodiment of the present disclosure.

It will be described again with reference to FIG. 2.

The evaluation module 240 functions to evaluate the life of the inkjet head unit 140 based on the comparison result of the comparison module 220.

The comparison module 220 may compare the number of discharges of the nozzle with the reference value to determine for each nozzle constituting the inkjet head unit 140 whether the number of discharges of the corresponding nozzle is equal to or greater than the reference value. Based on the comparison result of the comparison module 220, the evaluation module 240 may extract a nozzle that has discharged the substrate treatment liquid more than a reference value from among the nozzles constituting the inkjet head unit If a nozzle that has discharged the substrate treatment liquid more than a reference value is extracted from among the nozzles constituting the inkjet head unit 140, the evaluation module 240 may calculate the number of the nozzle that has discharged the substrate treatment liquid more than the reference value (that is, the nozzle having the number of discharges equal to or greater than the reference value). The evaluation module 240 evaluates whether the life of the inkjet head unit 140 has reached the usable life by comparing the calculated value and the reference value (i.e., the reference number) when the number of nozzles whose number of discharges is equal to or greater than the reference value is calculated.

When it is determined that the calculated value is equal to or greater than the reference value, the evaluation module 240 may evaluate that the life of the inkjet head unit 140 has reached the usable life. In this case, the evaluation module 240 may instruct the administrator to replace the inkjet head unit 140. Meanwhile, when it is determined that the calculated value is less than the reference value, the evaluation module 240 may evaluate that the life of the inkjet head unit 140 has not reached the usable life.

In the above, the reference value may be determined in advance, and the number of nozzles may correspond thereto.

Meanwhile, the evaluation module 240 may evaluate whether the life of the inkjet head unit 140 has reached the usable life by simply comparing the calculated value with the reference value, but is not limited thereto. After calculating ration of the calculated value, that is, the proportion of nozzles having the number of discharges equal to or greater than the reference value among all the nozzles constituting the inkjet head unit 140, the ratio of the calculated value may be compared with the reference ratio to determine whether the life of the inkjet head unit 140 reaches the usable life.

In the above case, when it is determined that the ratio of the calculated value is equal to or greater than the reference ratio, the evaluation module 240 may determine that the life of the inkjet head unit 140 has reached the usable life, and in this case, it may instruct the administrator to replace the inkjet head unit 140. On the other hand, when it is determined that the ratio of the calculated value is less than the reference ratio, the evaluation module 240 may determine that the life of the inkjet head unit 140 has not reached the usable life.

On the other hand, the control unit 160 implements equalization of the number of discharges by participating the nozzles having a relatively small usage amount in the printing the substrate G based on the usage amount for each nozzle (that is, the number of discharges of the nozzles counted by the count module 210). Accordingly, the life of the inkjet head unit 140 may be maximized. Hereinafter, this will be described.

Figure 6:
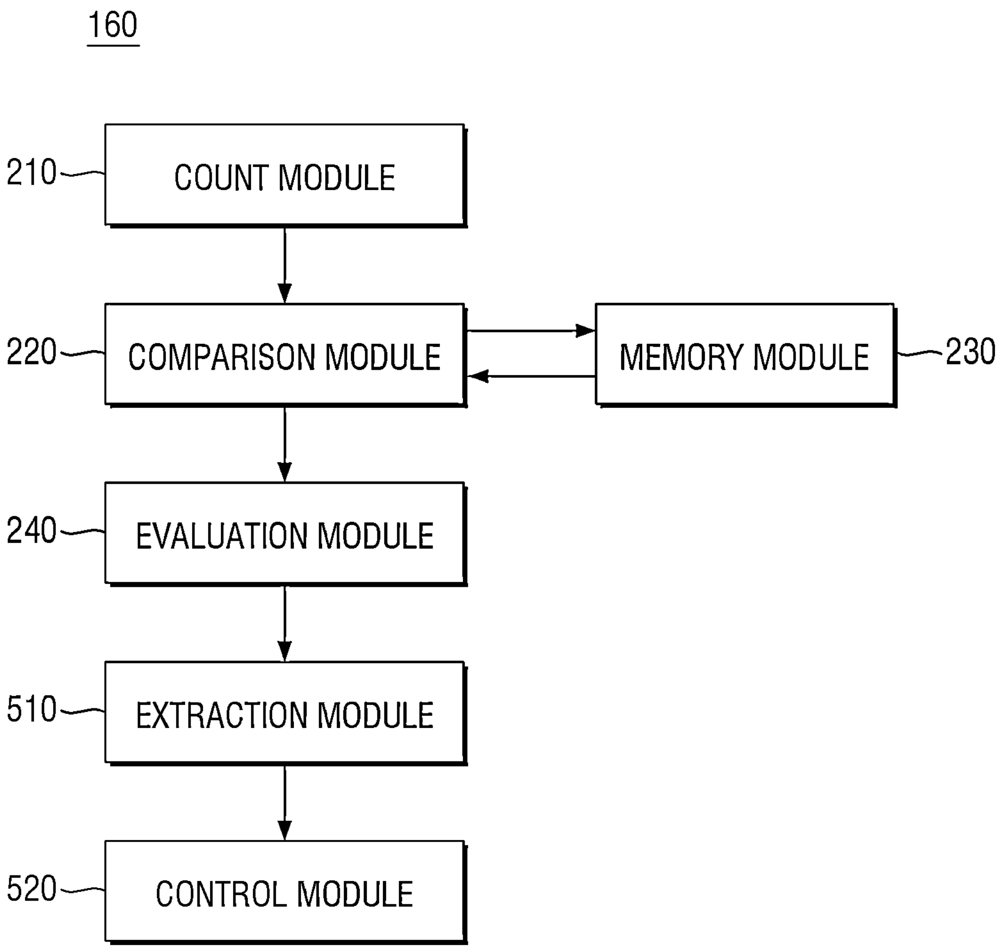
FIG. 6 is a fourth exemplary diagram schematically illustrating an internal module of a control unit constituting a substrate treating apparatus according to an embodiment of the present disclosure.

FIG. 6 is a fourth exemplary diagram schematically illustrating an internal module of a control unit constituting a substrate treating apparatus according to an embodiment of the present disclosure.

The extraction module 510 functions to extract a nozzle having a relatively small usage amount from among the nozzles constituting the inkjet head unit 140 based on the usage amount for each nozzle.

The extraction module 510 may randomly extract nozzles having a usage amount equal to or less than a reference amount when extracting a nozzle having a relatively small usage amount. Alternatively, the extraction module 510 may sequentially extract from the nozzle with the least usage amount.

The control module 520 functions to control the nozzle extracted by the extraction module 510 to be used when the substrate G is printed. The control module 520 may arrange the nozzles in the order extracted by the extraction module 510, and may control the nozzles to be used in printing the substrate G according to the arrangement order.

The functions of the extraction module 510 and the control module 520 may be operated separately from the functions of the comparison module 220 and the evaluation module 240. However, the present embodiment is not limited thereto. The above functions of the extraction module 510 and the control module 520 may be performed after the evaluation function of the evaluation module 240.

Figure 7:
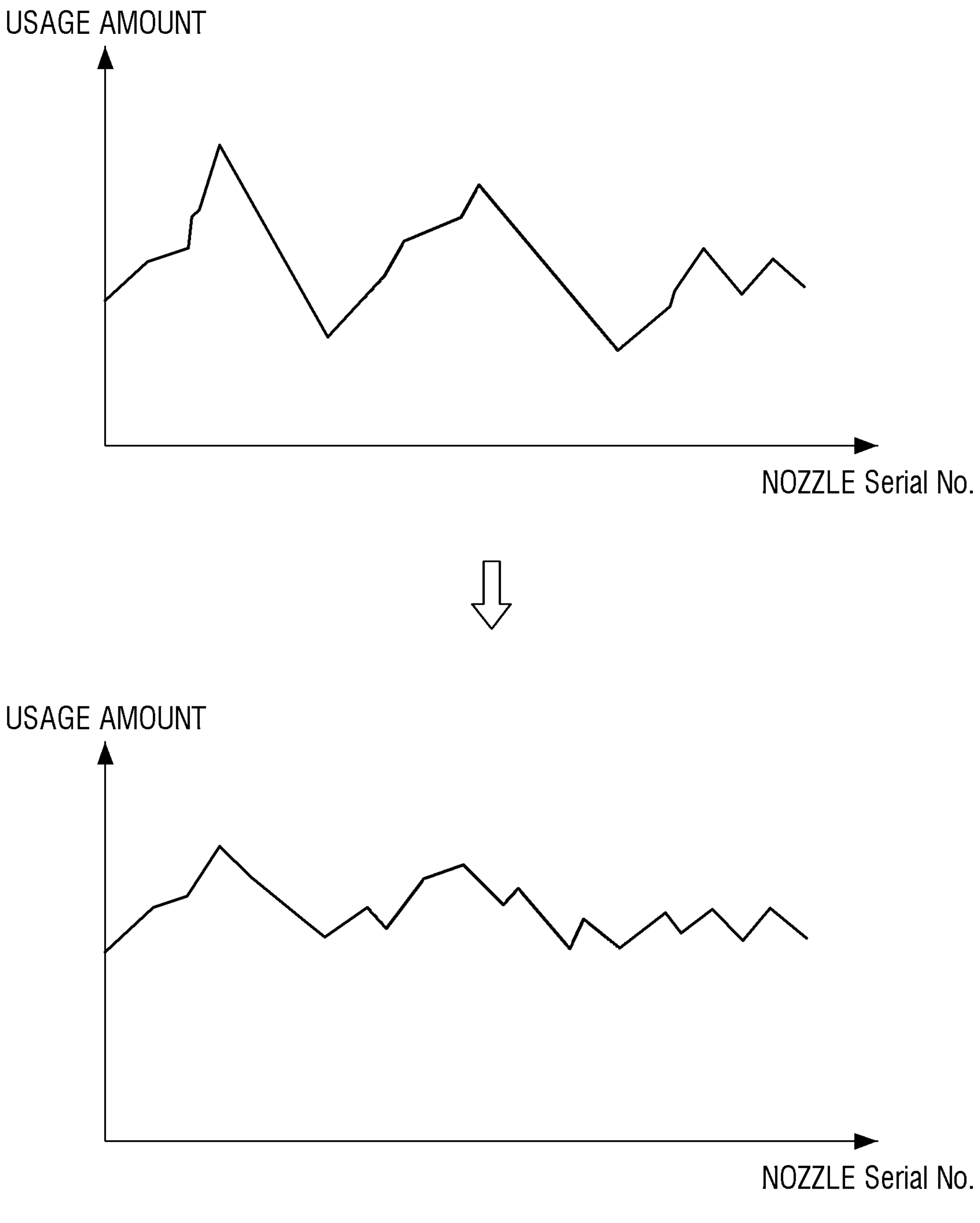
FIG. 7 is a reference diagram for describing the effect of the present disclosure.

For example, if it is determined by the evaluation module 240 that the life of the inkjet head unit 140 has not reached the usable life, the extraction module 510 and the control module 520 may sequentially perform the above functions. According to this embodiment, with these functions of the extraction module 510 and the control module 520, as shown in FIG. 7, it is possible to equalize the number of discharges for each nozzle, and accordingly, the effect of maximizing the usable life of the inkjet head unit 140 can be obtained. FIG. 7 is a reference diagram for describing the effect of the present disclosure.

Various functions of the control unit 160 have been described above with reference to FIGS. 2 to 7. These functions of the control unit 160 may be provided as a computer program, and the computer program may be mounted on a microprocessor in the control unit 160 and operated by the microprocessor.

The present disclosure relates to a software implementation of a method for predicting and maximizing the life of the inkjet head unit 140. In the present disclosure, the number of discharges of each nozzle constituting the inkjet head unit 140 may be counted and utilized for maintenance of the inkjet head unit 140.

In the present disclosure, the number of discharges of each nozzle constituting the inkjet head unit 140 is recorded in SW to predict the usable life of the inkjet head unit 140, and the substrate G is printed by reflecting the usage amount of each nozzle. Accordingly, the usable life of the inkjet head unit 140 may be maximized.

According to the present disclosure, by recording and recognizing the number of discharges for each nozzle of the inkjet head unit 140, the life of the inkjet head unit 140 can be recognized, and by participating more a nozzle with a small number of uses in generating an image, that is, printing the substrate G, and accordingly, the usable life of the inkjet head unit 140 can be maximized.

In the present disclosure, the substrate treatment liquid discharge of the inkjet head unit 140 of the inkjet facility (that is, the substrate treating apparatus 100) can be carried out by a printing command and a spitting command of the pattern SW. When printing/spitting command, since it has print image and used/unused nozzle information, it is possible to count the number of discharges of each nozzle. In the above, the spitting command is to discharge for a predetermined time at a predetermined frequency after setting the nozzle to be used, and the printing command is to send an image having printing information for each nozzle to the head driver to discharge it.

In the present disclosure, by counting the number of discharges of each nozzle, it is identified whether it approaches the physical life provided by the head maker, or approaches the user experiential replacement cycle due to an increase in defects (defective printing quality), an increase in nozzle outs, etc., and then it can predict the life of the inkjet head unit 140 and prepare for its replacement in advance. In addition, by generating a print image using a nozzle having a relatively low usage amount by identifying the usage amount for each nozzle, the life of the inkjet head unit 140 can be maximized through equalization of the number of discharges and used.

In summary, the features of the present disclosure can be summarized as follows.

First, by recording the number of times each nozzle of the inkjet head is used in SW, the usable life of the head can be predicted and prepared.

Second, it is possible to maximize the usable life of the head by considering the usage amount for each nozzle and reflecting it in image generation.

Although embodiments of the present disclosure have been described with reference to the above and the accompanying drawings, those skilled in the art, to which the present disclosure pertains, can understand that the present disclosure may be practiced in other specific forms without changing its technical concept or features. Therefore, it should be understood that the embodiments described above are illustrative in all respects and not limiting.

What is claimed is:

1. A control unit for performing maintenance of an inkjet head unit for discharging a substrate treatment liquid onto a substrate comprising:
- a count module for counting the number of discharges for each nozzle of the inkjet head unit;
- a comparison module for comparing the number of discharges with a reference value to determine whether the number of discharges is equal to or greater than the reference value; and
- an evaluation module for evaluating whether a life of the inkjet head unit has reached a usable life based on whether the number of discharges of each nozzle is equal to or greater than the reference value,
- wherein the count module counts the number of discharges based on whether a voltage is applied to a piezoelectric element involved in operation of a nozzle.

2. The control unit of claim 1, wherein the piezoelectric element is provided in the same number as the nozzle,
- wherein the count module counts the number of discharges based on whether a voltage is applied to a piezoelectric element in a corresponding relationship to the nozzle.

3. The control unit of claim 1, wherein the reference value is related to at least one of a print quality for the substrate and a nozzle that does not participate in printing a substrate.

4. The control unit of claim 3, wherein the reference value is related to the print quality, the reference value is a usage amount of a nozzle related to a case where a stain is formed on the substrate, or a usage amount of a nozzle related to a case where flatness of a layer formed on the substrate by print does not meet criteria.

5. The control unit of claim 3, wherein when the reference value is related to a nozzle that does not participate in printing the substrate, the reference value is a usage amount of a defective nozzle determined as defective.

6. The control unit of claim 5, wherein the defective nozzle is related to at least one of satellite discharge, non-discharge, and discharge position inaccuracy.

7. The control unit of claim 1 further comprises any one of,
- a memory module for storing the reference value;
- an input module for inputting the reference value; and
- a communication module for receiving the reference value from an outside, wherein the reference value is provided to the comparison module through any one of the memory module, the input module, and the communication module.

8. The control unit of claim 1, wherein the evaluation module compares the number of nozzles having the number of discharges equal to or greater than the reference value with a reference number to evaluate whether a life of the inkjet head unit had reached a usable life.

9. The control unit of claim 8, in response to the number of nozzles being equal to or greater than the reference number, the evaluation module evaluates that a life of the inkjet head unit has reached a usable life, and requests replacement of the inkjet head unit that has reached a usable life.

10. The control unit of claim 1, wherein the control unit allows a nozzle with a relatively small usage amount based on a usage amount for each nozzle to participate in printing the substrate.

11. The control unit of claim 1 further comprises, an extraction module for extracting a nozzle with a relatively small usage amount based on a usage amount for each nozzle; and a control module for controlling the extracted nozzle to participate in printing the substrate, wherein the extraction module and the control module operate based on an evaluation that a life of the inkjet head unit has not reached a usable life.

12. The control unit of claim 11, wherein the extraction module extracts a nozzle with a usage amount less than or equal to a reference amount, or extracts a nozzle with the smallest usage amount.

13. The control unit of claim 1, wherein the control unit determines whether the number of discharges matches the number of times voltage is applied to a piezoelectric element involved in operation of the nozzle.

14. The control unit of claim 13, wherein the control unit determines whether a match is made based on whether a nozzle normally discharges the substrate treatment liquid onto the substrate when a voltage is applied to the piezoelectric element.

15. The control unit of claim 14 further comprises, an imaging module for capturing a space between a nozzle and the substrate using a camera sensor; and a treating module for determining whether a nozzle discharges the substrate treatment liquid onto the substrate based on image information obtained through capturing.

16. The control unit of claim 15, wherein the imaging module captures the space when a voltage is applied to the piezoelectric element.

17. A control unit for performing maintenance of an inkjet head unit for discharging a substrate treatment liquid onto a substrate comprising:

a count module for counting the number of discharges for each nozzle of the inkjet head unit, wherein the count module counts the number of discharges based on whether a voltage is applied to a piezoelectric element involved in operation of a nozzle;

a comparison module for comparing the number of discharges with a reference value to determine whether the number of discharges is equal to or greater than the reference value; and an evaluation module for evaluating whether a life of the inkjet head unit has reached a usable life based on whether the number of discharges of each nozzle is equal to or greater than the reference value, wherein the control unit allows a nozzle with a relatively small usage amount to participate in printing the substrate based on a usage amount for each nozzle, wherein the reference value is related to at least one of a print quality for the substrate and a nozzle that does not participate in printing the substrate.

18. An apparatus for treating a substrate comprising:

a process treating unit for supporting a substrate while a substrate is treated;

an inkjet head unit including a plurality of nozzles and for discharging a substrate treatment liquid onto the substrate through the plurality of nozzles;

a gantry unit for moving the inkjet head unit;

a substrate treatment liquid supply unit for supplying the substrate treatment liquid to the inkjet head unit; and a control unit for performing maintenance of the inkjet head unit;

wherein the control unit comprises, a count module for counting the number of discharges for each nozzle of the inkjet head unit;

a comparison module for comparing the number of discharges with a reference value to determine whether the number of discharges is equal to or greater than the reference value; and an evaluation module for evaluating whether a life of the inkjet head unit has reached a usable life based on whether the number of discharges of each nozzle is equal to or greater than the reference value; and a camera sensor for capturing a space between the at least one nozzle and the substrate when at least one of the plurality of nozzles discharges the substrate treatment liquid onto the substrate.

* * * * *